Nov. 21, 1950 C. J. MENSMAN 2,530,715
MECHANICAL MOVEMENT
Filed Sept. 29, 1947 2 Sheets-Sheet 1
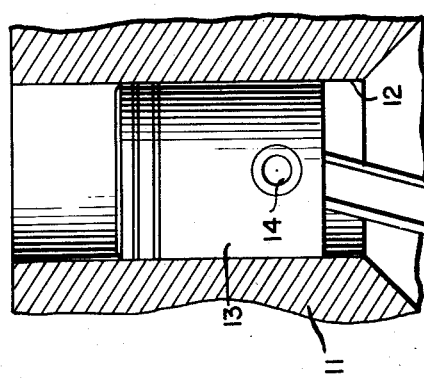
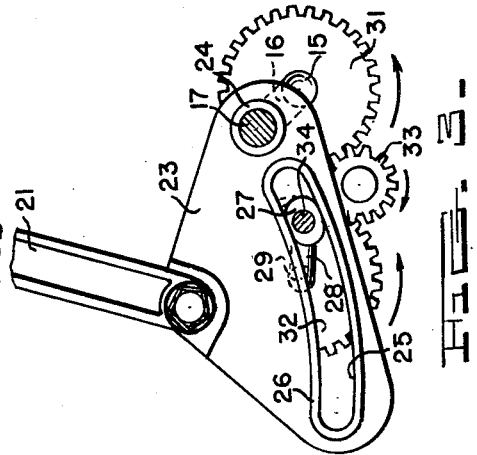
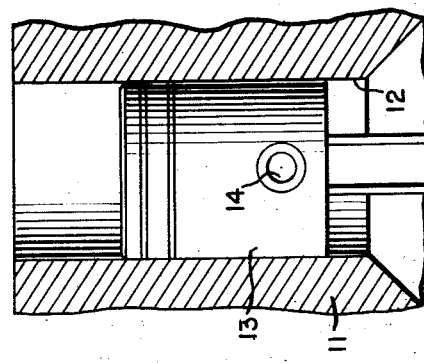
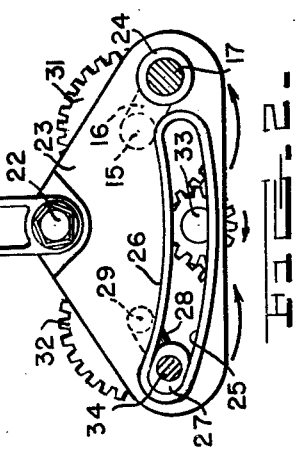
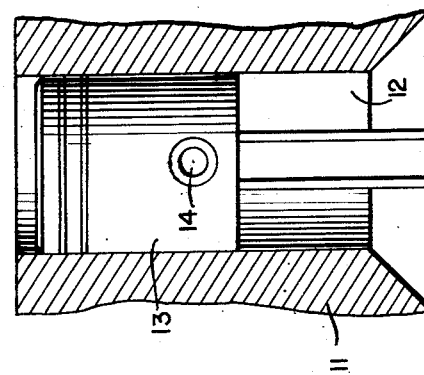
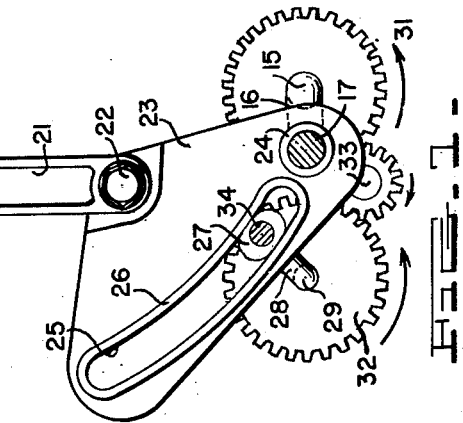
INVENTOR.
Charles J. Mensman
BY Church & Church
his Attorneys Nov. 21, 1950  C. J. MENSMAN  2,530,715
MECHANICAL MOVEMENT
Filed Sept. 29, 1947  2 Sheets-Sheet 2
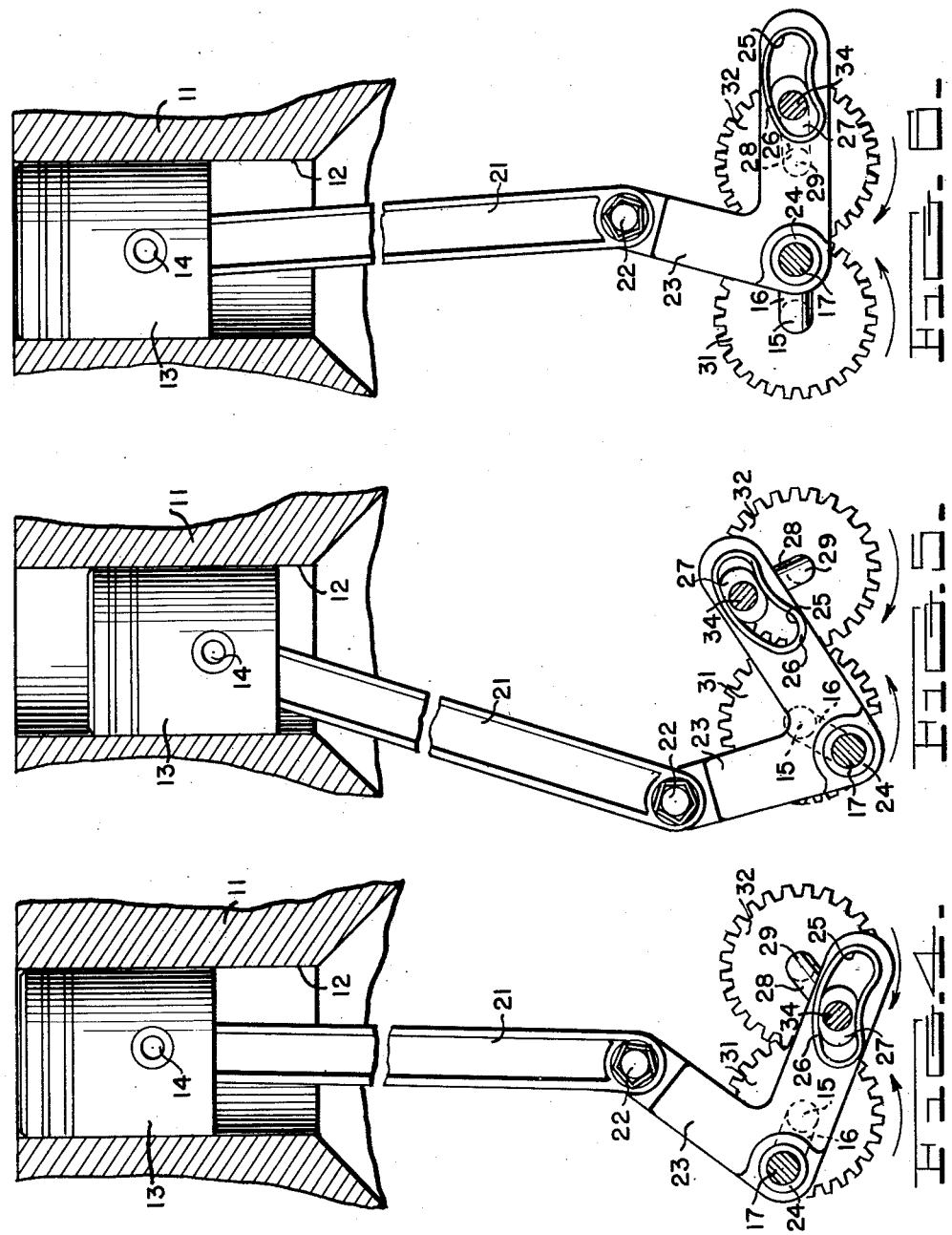
Inventor
Charles J. Mensman
By Church & Church
his Attorneys

Patented Nov. 21, 1950

2,530,715

UNITED STATES PATENT OFFICE 2,530,715

MECHANICAL MOVEMENT

Charles J. Mensman, Washington, D. C.

Application September 29, 1947, Serial No. 776,657

7 Claims. (Cl. 74—44)

This invention relates to a mechanical movement for transmitting rotary motion to or from reciprocating motion and specifically concerns mechanism for transmitting power between a rotary crank shaft and a reciprocating piston.

In various types of engines and pumps where power is transmitted between a crank shaft and a piston, the piston begins its stroke when the crank shaft is approximately in alinement with the direction of reciprocation. The stroke continues while the crank shaft rotates through substantially 180°. The piston reaches the opposite end of its stroke when the crank shaft has its crank again approximately in alinement with the direction of movement of the piston. While this is a simple arrangement, and is universally used, maximum leverage of the crank is attained at a time when the piston is midway of its stroke. In the case of an engine, maximum leverage is applied to the crank shaft after the piston has completed half of its working stroke. In the case of a pump, maximum force is applied to the piston when it has completed only one half of a compression stroke.

It is the major object of this invention to more efficiently transmit power between a rotary crank and a reciprocating piston by providing a mechanism whereby the crank on the crank shaft is substantially normal to the direction of movement of the piston when the piston is at one end of its stroke. In the case of a motor, this will result in the application of maximum force to the crank shaft when the piston begins its working stroke. In the case of a pump, maximum force will be applied to the piston as it reaches the end of its compression stroke.

A more specific object of the invention is to provide maximum leverage of a crank at the end of a stroke of the piston to which it is connected. According to the preferred form of the invention, this is accomplished by providing a two-part connecting rod. One part may be connected to the piston similar to a conventional connecting rod. The other part may have the form of a link connecting the crank on the crank shaft to the connecting rod. The two parts of a connecting rod are manipulated during each stroke of the piston to vary the effective length of the connecting rod so the piston is at one end of its stroke when the crank is substantially normal to the direction of reciprocation, that is, when the crank is more or less perpendicular to the connecting rod.

Other objects and advantages of the invention will become apparent from the following specification taken in connection with the accompanying drawings, wherein Figure 1 is a schematic representation of a mechanical movement showing the invention in its preferred form for transmitting power between a piston and a crank;

Figs. 2 and 3 are similar views of the mechanism shown in Fig. 1 but showing the parts in the relative positions they assume during different periods of a cycle;

Fig. 4 is a schematic representation of a modified form of the invention as applied to the mechanism for transmitting power between a piston and a rotary crank; and Figs. 5 and 6 are similar views of the mechanism shown in Fig. 4 but with the parts in different relative positions according to different periods of a cycle.

For purposes of illustration the invention is shown in the drawings embodied in the mechanism of an internal combustion engine for transmitting power from the piston to the crank shaft. Referring now to the drawings, there is shown, schematically, a portion of an engine block 11 bored with a cylinder 12 receiving a piston 13 which is intended to reciprocate in the bore 12. The piston 13 is provided with a wrist pin 14 for connection in a conventional manner to a connecting rod. The engine also has the customary crank shaft 15 on which there is shown a portion of a crank 16 with its appropriate bearing 17.

In a conventional internal combustion engine, a connecting rod having bearings formed in its opposite ends is usually connected between the wrist pin 14 and the crank bearing 17. In such a case, when the piston is at the top of its stroke, the crank 16 is substantially vertical. When an explosion occurs in the cylinder, the connecting rod has very little leverage on the crank during the first part of the downward movement of the piston, maximum leverage being attained after the piston had completed half of its working stroke.

In accordance with the present invention, when the piston 13 is at the upper end of its stroke, as shown in Fig. 1, the crank 16 is disposed substantially normal to the direction of reciprocation of the piston. This is accomplished by using a two-part connecting rod, having its upper part 21 in the form of a conventional connecting rod, one end of which may be provided with a bearing to fit the wrist pin 14. The other end of the connecting rod 21 is pivoted in any manner at 22 to a link 23. The other end of the link 23 is provided with a bearing 24 fitting onto the bearing 17 of the crank 16. The drawing does not show the details of assembly of the bearing 24 as a conventional arrangement for assembling a connecting rod onto the crank shaft may be used.

When the piston 13 begins its downward movement, the connecting rod parts are manipulated to change the effective length of the connecting rod so the complete downward motion of the piston is accomplished in somewhat less than a 180° turn of the crank 16. Referring to Fig. 2, the piston 13 is shown at the bottom of its stroke while the crank bearing 17 has passed through a turn of approximately 135°.

Preferably, the piston remains in its lowermost position for a substantial period although the crank shaft continues to turn. During this period that the piston dwells in its lowermost position, the connecting rod parts are further manipulated to vary the effective length of the connecting rod. Although the distance between the bearing 17 and the wrist pin 14 may become shorter, the piston 13 need not reciprocate. Thus, as shown in Fig. 3, the crank bearing 17 has turned through approximately 180° from the position shown in Fig. 2, but the piston 13 remains in its lowermost position. During the period that the crank pin 17 turns from the position shown in Fig. 3, to the position shown in Fig. 1, the effective length of the connecting rod is lengthened so the piston is raised through its entire stroke although the crank pin turns only approximately 45° and actually turns in a direction which would normally lower the piston.

The preferred form of the mechanism for manipulating the connecting rod parts to vary its effective length is shown in Figs. 1 to 3, and comprises primarily a guideway 25 formed in a portion of the link 23. As shown in the drawings, this guideway extends in a direction away from a line between the pivot 22 and the bearing 24. To provide a smooth operation of the piston, the guideway is preferably formed in a slight arc. Bearing surfaces 26 may be provided for a bearing block 27 which slides in the guideway 25. This bearing block, in effect provides a movable fulcrum for the lever 23.

Manipulation of the link 23 is effected by an auxiliary crank 28 on an auxiliary crank shaft 29 which is driven synchronously with the main crank shaft 15. This may be accomplished by gears 31 and 32 on the crank shafts 15 and 29, respectively, the gears 31 and 32 both meshing with an intermediate gear 33 so the two crank shafts are driven in the same direction. The crank 28 has a bearing 34 engaging with the bearing block 27.

As the piston 13 begins its downward stroke, the crank 16 is turned counter-clockwise toward a lower position while the crank 28 is also turned counterclockwise to a higher position and toward the left, as seen in Fig. 1. This tends to move the bearing block 27 toward the outer end of the guideway 25, changing the position of the fulcrum and thereby breaking the more or less straight line of the connecting rod 21 and link 23, so the effective length of the combined connecting rod is materially shortened. When the piston reaches its lowermost position, the crank bearing 34 has turned through the same angle as the crank bearing 17 so the bearing block 27 is moved to the extreme outer end of the guideway 25, thereby completing the downward stroke of the piston 13, although the main crank shaft 15 has turned considerably less than 180°.

As the main crank shaft continues to turn, synchronous turning of the auxiliary crank shaft causes crank bearing 34 to further manipulate the link 23 so, although the main crank bearing 17 turns through approximately 180°, to the position shown in Fig. 3, the piston 13 remains in its lowermost position. The piston does not begin to move upwardly until the two crank shafts turn from their positions, as shown in Fig. 3, through an angle of about 45° to their positions as shown in Fig. 1. Although the main crank shaft is moving the crank bearing 17 downwardly, the auxiliary crank shaft is moving the bearing 34 and bearing block 27 to substantially increase the effective length of the combined connecting rod resulting in an upward movement of the piston 13.

In the modified form of the invention shown in Figs. 4 to 6, inclusive, there is illustrated one of the many other arrangements for manipulating a two-part connecting rod to vary its effective length so the crank of the crank shaft is positioned substantially perpendicular to the direction of movement of the piston when the piston is at one end of its stroke.

Although the positions of the main and auxiliary crank shafts 17 and 29, respectively, are reversed, the elements of the mechanism shown in Fig. 4 correspond to the elements of the mechanism shown in Fig. 1 except that the intermediate gear 33 is omitted and the gears 31 and 32 meshed together to provide a synchronous drive for the main and auxiliary crank shafts.

As the piston 13 moves downwardly from its uppermost position, as shown in Fig. 4, the auxiliary crank 28 moves the fulcrum or bearing block 27 in guideway 25 to manipulate the link 23 and effectively shorten the length of the two-part connecting rod by changing the relative positions of the two parts 21 and 23 to an angularly disposed position as shown in Fig. 5. Inasmuch as the two crank shafts are rotated in opposite directions, the position and shape of the guideway 25 differs somewhat from that shown in Figs. 1 and 3. After the piston 13 reaches the bottom of its stroke, as shown in Fig. 5, continued turning of the crank shafts returns the piston to its uppermost position, as shown in Fig. 6. Thus, the piston moves down and returns to its uppermost position while the crank shaft turns through little more than 180°. During the downward travel of the piston 13 the auxiliary crank 28, turning in the opposite direction to the main crank 16 manipulates link 23 to effectively shorten the length of the connecting rod so the piston completes its downward stroke while the crank shafts turn about 90°. After this, and during upward turning movement of the crank 16, the link 23 is further manipulated to lengthen the effective length of the connecting rod so the upward stroke of the piston is completed when the parts are positioned as shown in Fig. 6. As the crank shafts continue to turn from their positions shown in Fig. 6 to their positions shown in Fig. 4, the effective length of the connecting rod is again shortened and then lengthened. However, this change in the effective length offsets the upward and downward movement of the crank 16 so the piston remains in its uppermost position. The dwell period of the piston lasts while the crank shafts turn through approximately 180° from the position in Fig. 6 to the position in Fig. 4.

Although the invention has been illustrated as applied to the connecting rod mechanism for an internal combustion engine, it may be applied equally well to a reciprocating pump. It may be utilized in various other applications where it is desired to efficiently transmit rotary motion to or from reciprocating motion.

From the foregoing description it will be apparent that an important feature of the invention resides in the manipulation of a two-part connecting rod to vary the effective length of the connecting rod so the piston completes a full stroke during the period that the crank shaft is rotating less than the 180° normally required for each piston stroke. With this arrangement, it is possible to have the piston at one end of its stroke when a crank on the crank shaft is substantially normal to the connecting rod. That is, the crank is substantially normal to the direction of reciprocation when the piston is at one end of its stroke. Manipulation of the two-part connecting rod is accomplished, in the preferred form of the invention, by providing a movable fulcrum in a guideway on the link forming one part of the connecting rod. An auxiliary crank shaft has a crank cooperating with this guideway to move the fulcrum and to manipulate the link and thereby vary the effective length of the connecting rod.

In the case of a motor, maximum force is applied to the crank shaft at the beginning of each working stroke of the piston, because the connecting rod applies maximum leverage at that time instead of half way through the stroke. Conversely, in the case of a pump, the crank shaft applies maximum force to the piston when it nears the end of its stroke at the time of maximum compression. In this way, the leverage of the crank shaft is utilized to its fullest extent.

In addition, the mechanical advantage gained by having the crank normal to the connecting rod at one end of the stroke, a further gain in efficiency is accomplished by the invention because the radius of the crank is greater than one half of the length of the stroke. In conventional engines and pumps, the length of the stroke is exactly double the radius of the crank. By using the present invention, the ratio of the radius to the length of the stroke is increased. As a result, for the same length of stroke, the crank may have a larger radius, so a greater force is applied to the crank shaft.

It is contemplated that the invention may assume various forms and the foregoing embodiments are merely illustrative and are not to be construed in a limiting sense.

What is claimed is:

1. Mechanism for transmitting power between a reciprocating element and a rotary crank element comprising a connecting rod having one end adapted for connection to the reciprocating element, a link pivoted to the other end of said connecting rod and adapted for connection to said rotary element, said link having a guideway, and means driven synchronously with said crank element and cooperating with said guideway to manipulate said link in a manner varying the effective length of said connecting rod during rotation of said crank.

2. Mechanism for transmitting power between a reciprocating element and a rotary crank element comprising a connecting rod having one end adapted for connection to the reciprocating element, a link pivoted to the other end of said connecting rod and adapted for connection to said rotary element, said link having a guideway, and an auxiliary crank driven synchronously with said crank element and cooperating with said guideway to manipulate said link so said crank element is substantially normal to said connecting rod when said reciprocating element is at one end of its stroke.

3. Mechanism for transmitting power between a reciprocating element and a rotary crank element comprising a connecting rod having one end connected to the reciprocating element, a link connected between the other end of said reciprocating element and said rotary crank, an auxiliary crank geared to said crank element and cooperating with a guideway on the link, said guideway being arranged so that said auxiliary crank causes said link to turn about the axis of said rotary crank element during movement of the reciprocating element to thereby vary the effective length of the connecting rod.

4. In combination with a reciprocating piston and a rotary crank shaft, motion-transmitting mechanism comprising a connecting rod having one end connected to the piston, a link connected between a crank on the crank shaft and the other end of said connecting rod, an auxiliary crank shaft geared to said rotary crank shaft, a crank on said auxiliary crank shaft cooperating with a guideway on said link to manipulate said link and connecting rod in a manner to vary the effective length thereof during rotation of said crank shaft.

5. Mechanism for transmitting power between a reciprocating element and a rotary crank element comprising a connecting rod having one end adapted for connection to the reciprocating element, a lever pivotally connected to the other end of said connecting rod and adapted for connection to said rotary element, means driven synchronously with said crank element, and a fulcrum slidably moved by said means along said lever to manipulate said lever in a manner varying the effective length of said connecting rod during rotation of said crank.

6. Mechanism for transmitting power between a reciprocating element and a rotary crank element comprising a connecting rod having one end adapted for connection to the reciprocating element, a lever pivotally connected to the other end of said connecting rod and adapted for connection to said rotary element, a fulcrum slidable along said lever, and an auxiliary crank driven synchronously with said crank element slidably moving said fulcrum along said lever to manipulate said lever so said crank element is substantially normal to said connecting rod when said reciprocating element is at one end of its stroke.

7. In combination with a reciprocating piston and a rotary crank shaft, motion-transmitting mechanism comprising a connecting rod having one end connected to the piston, a lever connected between a crank on the crank shaft and the other end of said connecting rod, a fulcrum slidable along said lever, and an auxiliary crank driven synchronously with said crank shaft slidably moving said fulcrum along said lever to manipulate said lever in a manner varying the effective length of said connecting rod during rotation of said crank.

CHARLES J. MENSMAN.

REFERENCES CITED

The following references are of record in the file of this patent:

UNITED STATES PATENTS

| Number | Name | Date |
|---|---|---|
| 889,859 | Robertson | June 2, 1908 |
| 1,107,529 | Kitton | Aug. 18, 1914 |
| 1,506,626 | Freer | Aug. 26, 1924 |
| 1,745,793 | Hammond | Feb. 4, 1930 |
| 1,784,192 | MacFarlane | Dec. 9, 1930 |
| 1,797,493 | Baxter | Nov. 24, 1931 |
| 2,005,000 | Miller | June 18, 1935 |